United States Patent
Schöttmer

(10) Patent No.: US 6,267,796 B1
(45) Date of Patent: Jul. 31, 2001

(54) FILTER ASSEMBLY WITH A DOUBLE SEALING LIP

(75) Inventor: Dieter Schöttmer, Hirschberg (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/451,601

(22) Filed: Nov. 30, 1999

(30) Foreign Application Priority Data

Nov. 30, 1998 (DE) ................................................ 198 55 244

(51) Int. Cl.$^7$ ................................................ B01D 46/00
(52) U.S. Cl. .................. 55/502; 55/509; 55/DIG. 28; 55/DIG. 30; 55/385.3
(58) Field of Search ................................ 55/385.1, 385.3, 55/502, 509, DIG. 28, DIG. 30, 490, 497, 499, 507

(56) References Cited

U.S. PATENT DOCUMENTS

| | | | |
|---|---|---|---|
| 5,472,379 | * 12/1995 | Andress et al. | 55/502 |
| 5,509,950 | * 4/1996 | van de Graaf et al. | 55/502 |
| 5,554,205 | * 9/1996 | Ernst et al. | 55/502 |
| 5,620,505 | * 4/1997 | Koch et al. | 55/502 |
| 5,639,287 | * 6/1997 | Van de Graaf et al. | 55/385.3 |
| 5,720,790 | * 2/1998 | Kometani et al. | 55/502 |
| 5,755,844 | * 5/1998 | Arai et al. | 55/502 |
| 5,792,229 | * 8/1998 | Sassa et al. | 55/502 |
| 5,849,187 | * 12/1998 | Plaisier | 55/502 |
| 5,879,423 | * 3/1999 | Luka et al. | 55/502 |
| 5,902,361 | * 5/1999 | Pomplun et al. | 55/502 |
| 5,919,284 | * 7/1999 | Perry, Jr. et al. | 55/502 |
| 6,045,598 | * 4/2000 | Fath et al. | 55/502 |

FOREIGN PATENT DOCUMENTS 0 649 335   4/1997  (EP) .

* cited by examiner

Primary Examiner—David A. Simmons
Assistant Examiner—Minh-Chau T. Pham
(74) Attorney, Agent, or Firm—Kenyon & Kenyon

(57) ABSTRACT

A filter assembly includes an accordion fold pack made of filter material, which is sealingly joined to a retention frame. The retention frame has at its end face, at least on one side, a bracing whose length corresponds essentially to length of an end-face fold of the accordion fold pack extends the bracing essentially parallel to the direction of the end-face fold edge of the accordion fold pack and is arranged in the end-face fold. Disposed at the end face of the retention frame is a double sealing lip which extends in the direction of the end-face fold edge, as well as essentially parallel to the bracing. The double sealing lip is able to swivel about a film-hinge-type joint, and can be sealingly positioned with first sealing lip against end-face fold wall, and with second sealing lip against a boundary wall of a filter housing that faces the fold wall.

8 Claims, 5 Drawing Sheets

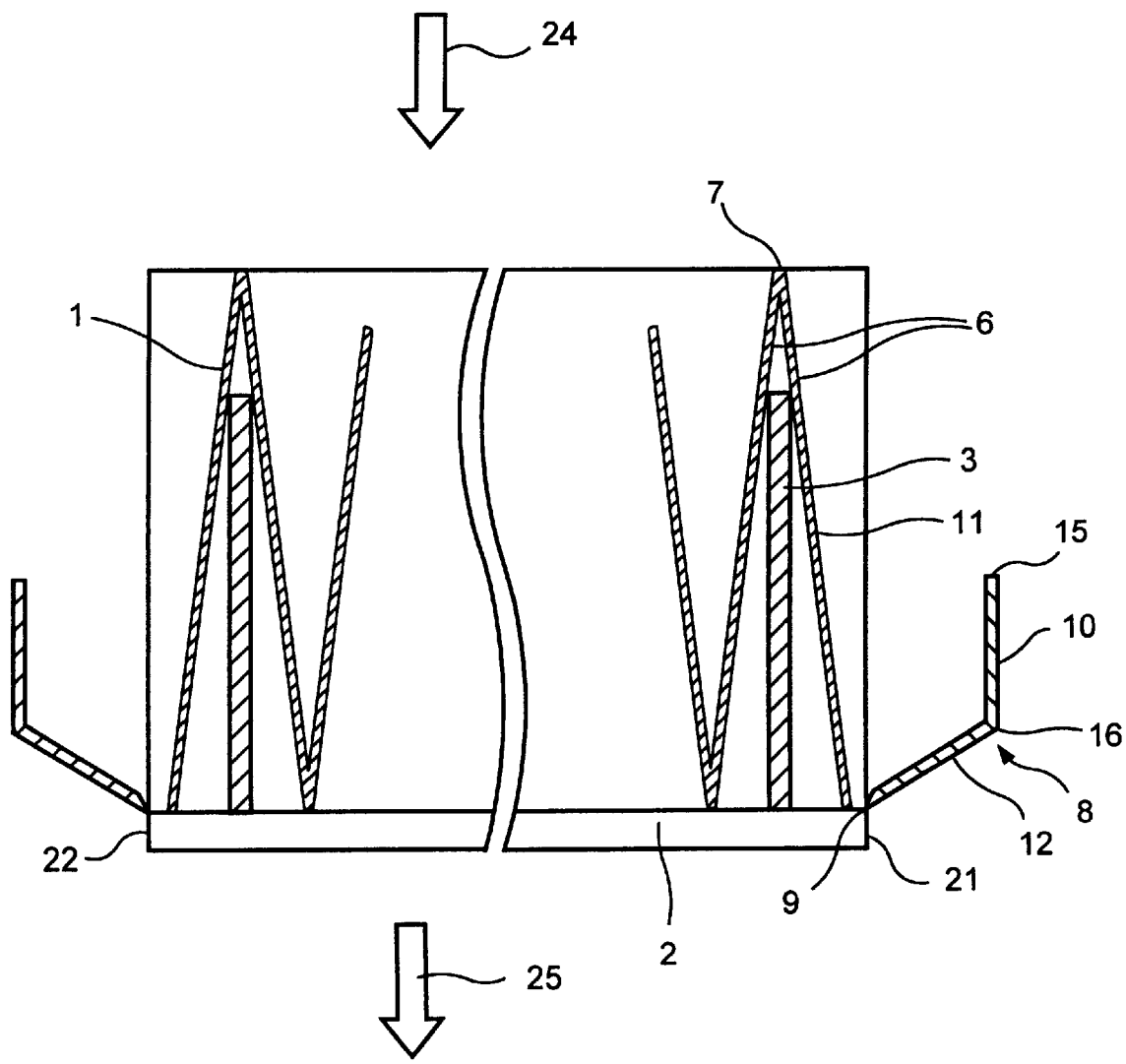
F I G. 1

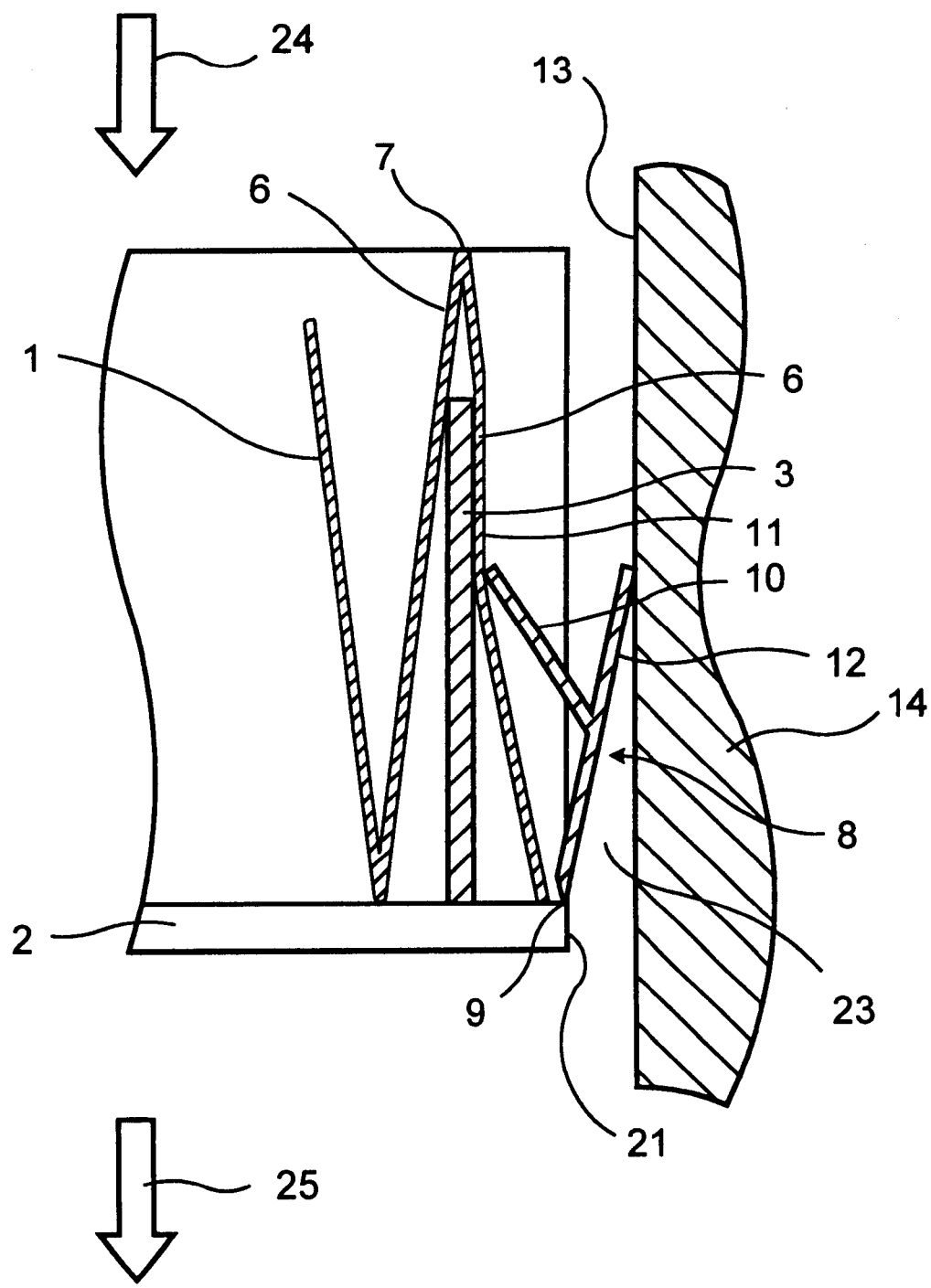
F I G. 4

FILTER ASSEMBLY WITH A DOUBLE SEALING LIP

BACKGROUND OF THE INVENTION

The invention relates generally to a filter assembly. More particularly, the invention relates to a filter assembly including an accordion fold pack made of filter material, which is sealingly joined to a retention frame. Disposed at the end face of the retention frame, at least on one side, is a bracing whose length corresponds essentially to the length of the end-face fold. The bracing extends essentially parallel to the direction of the end-face fold edge of the accordion fold pack and is arranged in the end-face fold. European Patent 0 649 335 A1 discloses one such filter assembly. In that patent, the side walls of the accordion fold pack are in each case sealingly overlapped by a stabilizing strip. The stabilizing strip on the side facing the retention frame has a separately produced sealing strip that can be positioned against the retention frame under elastic prestressing, forming a seal. The seal between the retention frame and a filter housing surrounding the retention frame is effected by a further seal which is formed separately from the seal between the accordion fold pack and the retention frame.

SUMMARY OF THE INVENTION

The object underlying the invention is to further develop a filter assembly of the type discussed above, in such a way that it has a simple design with few parts and, because of this, can be produced inexpensively and easily from a standpoint of production engineering. In addition, the filter assembly should be easier to install and have better working properties.

To achieve the objective, disposed at the end face of the retention frame, is a double sealing lip which extends essentially parallel to the bracing in the direction of the end-face fold edge. The double sealing lip is able to swivel about a joint, formed like a film hinge, and can be positioned sealingly with the first sealing lip against the end-face fold wall, and with the second sealing lip against a filter-housing boundary wall facing the fold wall. The filter assembly thus allows effective sealing of the end face of the accordion fold pack with respect to the retention frame. The first sealing lip presses the end-face fold wall against the surface of the bracing, forming a seal. At the same time, the double sealing lip ensures an effective seal between the retention frame and the filter housing, obviating the need for using secondary sealing means such as sealing foam. The double sealing lip is jammed, under elastic prestressing, sealingly between the boundary wall of the filter housing and the fold wall adjacent to the bracing. The double sealing lip is preferably configured in one piece of uniform material.

According to one advantageous refinement, the retention frame can be made of a polymer material. In this case, it is advantageous that the entire filter assembly has a low weight and is resistant to corrosion.

The double sealing lip can also preferentially be made of a polymer material, one advantageous refinement providing for the possibility of configuring the retention frame and the double sealing lip from a uniform material, integrally and continuously with one another. Preferably polypropylene (PP) or polyethylene (PE) are used as materials both for the retention frame and for the double sealing lip, the angled double sealing lip being secured to the retention frame by the hinge joint. Such a one-piece design makes it substantially easier to handle the filter assembly, for instance during its installation in the filter housing.

The flexible attachment of the double sealing lip simplifies the pre-assembly of the accordion fold pack in the retention frame, as well as the assembly and disassembly of the entire filter unit.

The accordion fold pack and the retention frame form a unit which can be preassembled, this unit being inserted into the filter housing. During the installation of the unit into the filter housing, the double sealing lip is automatically positioned with its first sealing lip against the end-face fold wall of the accordion fold pack, and presses the fold wall sealingly together with the bracing. In addition, the second sealing lip, under elastic prestressing, is simultaneously positioned sealingly against the retention-frame boundary wall facing the accordion fold pack, so that this region is reliably sealed as well.

The elasticity of the double sealing lip can compensate for tolerances of the accordion fold pack and/or of the retention frame and/or of the filter housing subject to manufacture.

Rattling noises of the filter assembly during its use are eliminated by the elastic prestressing of the double sealing lip between the accordion fold pack and the filter housing.

According to a first embodiment, the double sealing lip is angled in the shape of a roof. The first sealing lip, which is positionable against the fold wall, is formed by the end facing away from the joint. The second sealing lip, positionable against the boundary wall, is formed by a vertex. The advantage of such an embodiment is that the double sealing lip has a simple geometric shape, and therefore is easy to manufacture.

According to a second embodiment, which is more advantageous in terms of technical function, the double sealing lip—is essentially Y-shaped when viewed in cross-section. The two sealing lips are formed by the respective ends of the forkshaped limbs. With increasing pressure difference between the upstream side and the downstream side of the filter assembly, the two sealing lips are applied more strongly against the respective adjoining surfaces, the contact pressure of the sealing lips against the sealing surfaces being essentially proportional to the pressure difference. Particularly in the case of comparatively large pressure differences of more than 500 Pa, the second embodiment of the double sealing lip is preferred over the first embodiment of the double sealing lip described at the outset, in order to minimize leakages to the greatest extent possible.

The accordion fold pack preferably is made of a nonwoven fabric and is used, for example, as an automobile interior filter for air filtration. For most application cases, it is advantageous for one double sealing lip to be arranged on each end face of the retention frame.

BRIEF DESCRIPTION OF THE DRAWINGS

FIG. 1 is a partial, cross-sectional view of a first embodiment of a filter element constructed according to the principles of the invention;

FIG. 4 shows the unit from FIG. 3, installed in a filter housing; and

DETAILED DESCRIPTION OF THE INVENTION

In each of the two illustrative embodiments illustrated in FIGS. 1 through 5, a filter assembly is shown composed of an accordion fold pack 1 and a retention frame 2. In the embodiments shown, accordion fold pack 1 is made from a non-woven fabric, whereas retention frame 2 is manufactured from polypropylene.

Figure 2:
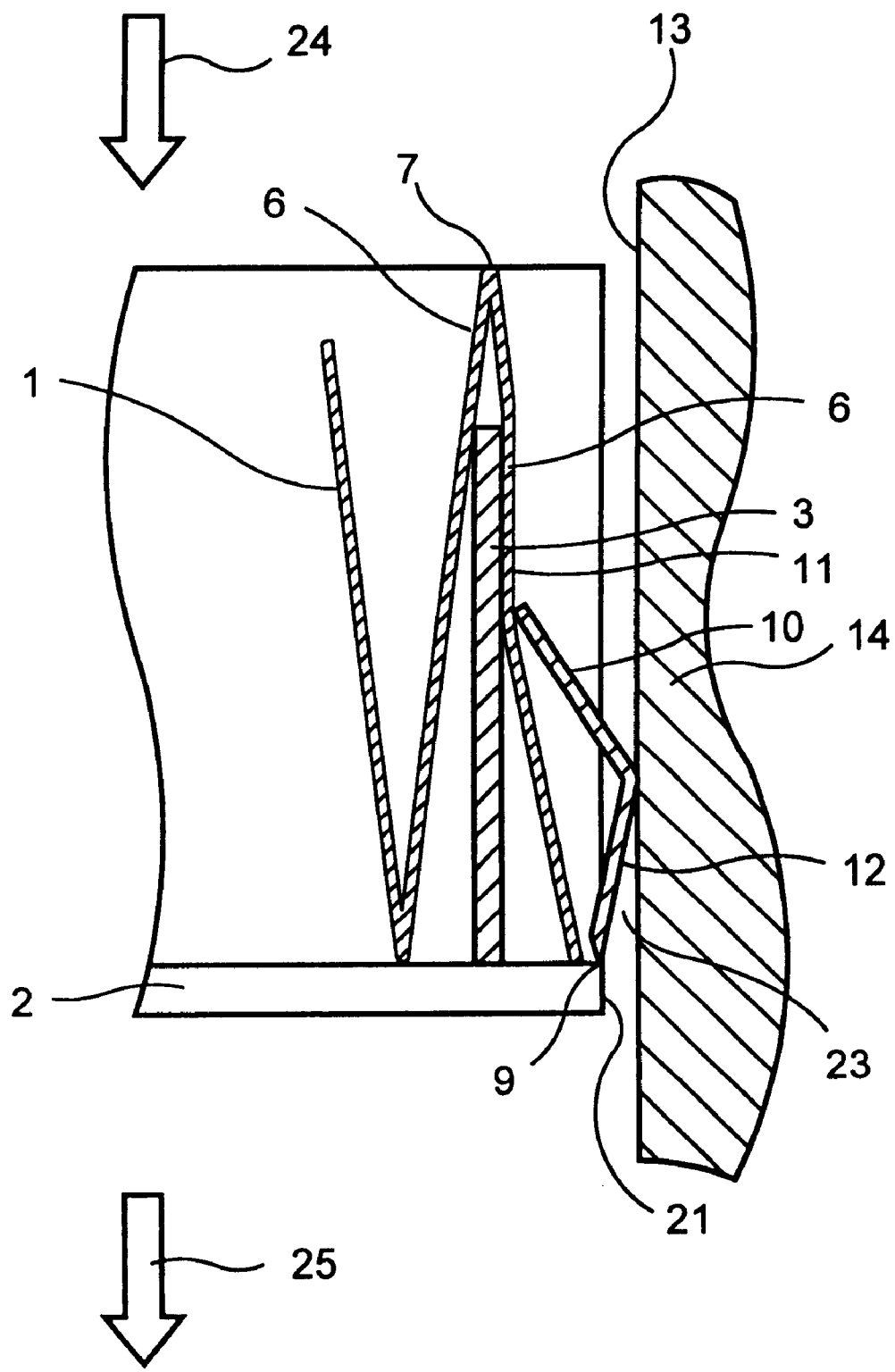
FIG. 2 shows the unit from FIG. 1, installed in a filter housing.

In the illustrative embodiments shown, retention frame 2 has a bracing 3 at its end face on both sides, the bracings forming an integral component of retention frame 2 and is constructed from the same material. Each bracing 3 has a length which corresponds essentially to a length of the respective end-face fold 6. End-face folds 6 overlap bracings 3, arranged at the end face, which extend parallel to the direction of the end-face fold edges 7 of accordion fold pack 1. End-face folds 6 of accordion fold pack 1 are stabilized by bracings 3. As seen in FIGS. 2 and 4, due to the contact pressure of end-face fold wall 11 against bracing 3, a reliable seal is effected in this region by first sealing lip 10.

Preferably, double sealing lip 8 is configured integrally and continuously with retention frame 2 and of the same material, and is joined to the retention frame by a film-hinge-type joint 9. Alternatively, it is possible to manufacture double sealing lip 8 from a different material than retention frame 2.

Double sealing lip 8 is able to swivel about joint 9 in the direction of fold wall 11, and can be positioned with first sealing lip 10 against end-face fold wall 11. Second sealing lip 12 can be positioned against boundary wall 13 of filter housing 14 that faces fold wall 11, forming a seal.

FIG. 1 shows a unit which can be preassembled, composed of accordion fold pack 1 and retention frame 2, in the uninstalled state. Double sealing lip 8 is angled in the shape of a roof, first sealing lip 10 being disposed at end 15 of double sealing lip 8 that faces away from joint 9. Second sealing lip 12, which in the installed state according to FIG. 2 can be positioned against boundary wall 13, is formed by vertex 16.

The unit from FIG. 1, which can be preassembled, is shown in the installed state in FIG. 2. It can be seen that second sealing lip 12 abuts, under elastic prestressing, against boundary wall 13 of filter housing 14, forming a seal. It is of crucial importance that—viewed in cross-section—the surface between joint 9 and second sealing lip 12 continuously delimits a gap 23 which—starting from second sealing lip 12 in the direction of joint 9—has a widening cross-section. This ensures that second sealing lip 12 is always in perfect contact with boundary wall 13, even when it is necessary to compensate for tolerances of accordion fold pack 1 and/or of retention frame 2 and/or of filter housing 14 contingent on manufacture.

Figure 3:
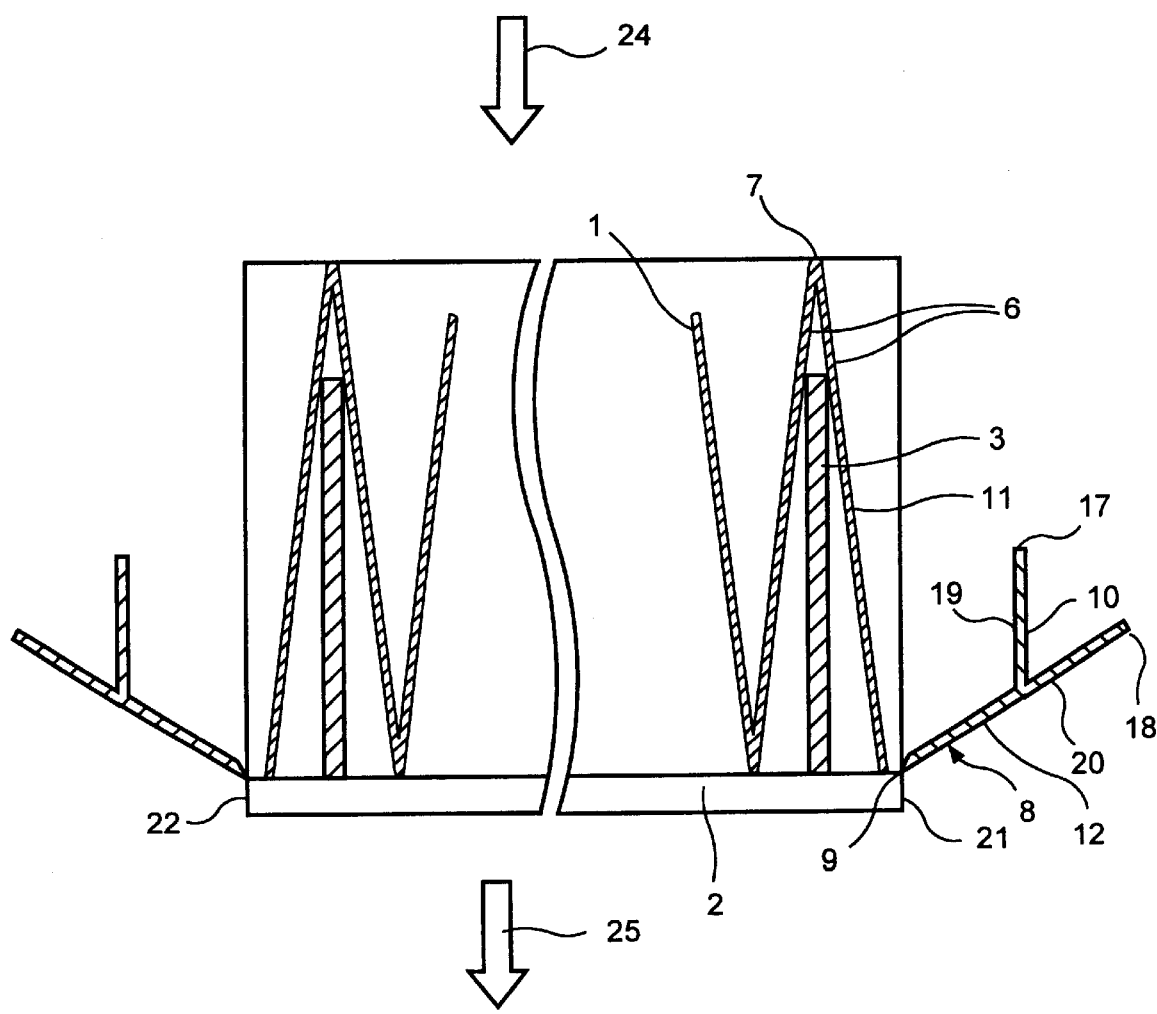
FIG. 3 is a partial, cross-sectional view of a second embodiment of a filter element.
Figure 5:
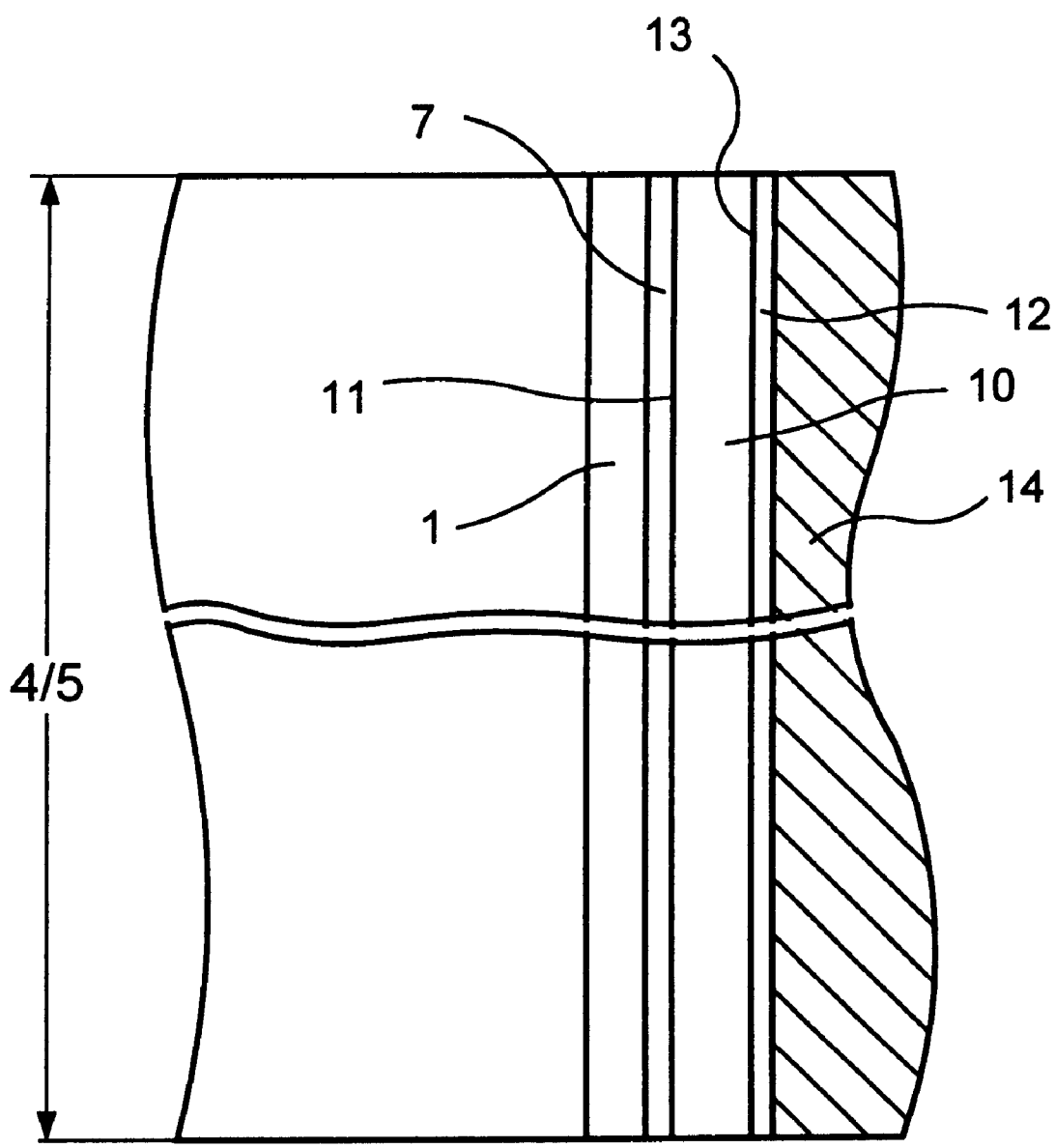
FIG. 5 shows a segment from a top view of the filter assembly shown in FIG. 3.

The second exemplary embodiment according to FIGS. 3 through 5 differs from the previously described exemplary embodiment due to the geometry of double sealing lip 8. In this exemplary embodiment, double sealing lip 8—viewed in cross-section—is essentially Y-shaped, the two sealing lips 10, 12 being formed by the respective ends 17, 18 of fork-shaped limbs 19, 20.

FIG. 3 shows the unit, which can be preassembled, composed of accordion fold pack 1 and retention frame 2 in the uninstalled state.

FIG. 4 shows the unit from FIG. 3, which can be preassembled, installed in a filter housing 14. First sealing lip 10 contacts end-face fold wall 11; second sealing lip 12 contacts boundary wall 13 of filter housing 14. Both sealing lips 10, 12, under elastic prestressing, are in contact with the respective adjacent surfaces, forming a seal. End-face fold wall 11 is pressed sealingly against bracing 3 by the contact pressure of first sealing lip 10.

The Y-shaped design of double sealing lip 8 ensures that, with increasing pressure difference between on-coming-flow side 24 and flow-off side 25, the contact pressure of both sealing lips 10, 12 against the respective adjoining surfaces of fold wall 11 and boundary wall 13 likewise increases.

FIG. 5 shows a top view of the installed filter assembly from FIG. 4. Both sealing lips 10, 12 can be seen in the top view, first sealing lip 10 being braced against end-face fold wall 11 of accordion fold pack 1, and second sealing lip 12 being braced against boundary wall 13 of filter housing 14.

What is claimed is:

1. A filter assembly, comprising:
    a retention frame with an end face;
    an accordion fold pack with an end-face fold, the fold pack being made of filter material, the fold pack sealingly joined to the retention frame;
    a bracing located on at least one side of the retention frame extending essentially parallel to the direction of an end-face fold edge of the accordion fold pack, the length of the bracing being essentially equal to the length of the end face fold of the accordion fold pack, the bracing being arranged within the end-face fold;
    a double sealing lip, comprising a first sealing lip and a second sealing lip, disposed at the end face of the retention frame, the double sealing lip extending essentially parallel to the bracing in the direction of the end-face fold edge; and
    a hinge joint swivelly attaching the double sealing lip to an end face of the retention frame, so that the double sealing lip, can be sealingly positioned with the first sealing lip against an end-face fold wall, and with the second sealing lip against a boundary wall of a filter housing that faces the end-face fold wall.

2. A filter assembly as set forth in claim 1, wherein the retention frame is made of polymer material.

3. A filter assembly as set forth in claim 1, wherein the double sealing lip is made of polymer material.

4. A filter assembly as set forth in claim 1, wherein the retention frame and the double sealing lip are formed integrally and continuously with one another of a uniform material.

5. A filter assembly as set forth in claim 4, wherein
    the double sealing lip is angled in the shape of a roof, the roof having an end facing away from the joint and a vertex; and wherein
    the first sealing lip is formed by the end and the second sealing lip is formed by the vertex.

6. A filter assembly as set forth in claim 1, wherein the double sealing lip, viewed in cross-section, is essentially Y-shaped, and that the two sealing lips are formed by the respective ends of the fork-shaped limbs.

7. A filter assembly as set forth in claim 1, wherein the accordion fold pack is made of a non-woven fabric.

8. A filter assembly as set forth in claim 1, wherein a double sealing lip is arranged at each end face of the retention frame.

* * * * *